(12) United States Patent  
Petersén

(10) Patent No.: US 9,231,398 B2  
(45) Date of Patent: Jan. 5, 2016

(54) CABLE COLLECTOR

(71) Applicant: Zound Industries International AB, Stockholm (SE)

(72) Inventor: Erik Petersén, Nacka (SE)

(73) Assignee: Zound Industries International AB, Stockholm (SE)

( * ) Notice: Subject to any disclaimer, the term of this patent is extended or adjusted under 35 U.S.C. 154(b) by 0 days.

(21) Appl. No.: 14/240,574

(22) PCT Filed: Oct. 26, 2012

(86) PCT No.: PCT/SE2012/051156
§ 371 (c)(1),
(2) Date: Feb. 24, 2014

(87) PCT Pub. No.: WO2013/062477
PCT Pub. Date: May 2, 2013

(65) Prior Publication Data
US 2014/0367139 A1 Dec. 18, 2014

(30) Foreign Application Priority Data
Oct. 27, 2011 (SE) ........................... 1151003

(51) Int. Cl.
*H02G 15/06* (2006.01)
*F16B 2/20* (2006.01)
(Continued)

(52) U.S. Cl.
CPC ............... *H02G 15/06* (2013.01); *F16B 2/20* (2013.01); *H02G 11/00* (2013.01); *H04M 1/15* (2013.01);
(Continued)

(58) Field of Classification Search
CPC .......... H02G 15/06; H02G 11/00; F16B 2/20; H04M 1/15; H04M 1/6058; Y10T 24/3953; H04R 1/1033; H01B 7/06
USPC ................................................ 174/79, 74 R
See application file for complete search history.

(56) References Cited

U.S. PATENT DOCUMENTS 3,275,969 A 9/1966 Sheeran
5,560,564 A * 10/1996 Maynard ................... 242/402
(Continued)

FOREIGN PATENT DOCUMENTS

EP 0 336 654 A2 10/1989
WO WO 2010/063081 A1 6/2010
(Continued)

OTHER PUBLICATIONS

International Search Report for PCT/SE2012/051156 dated Feb. 20, 2013.
(Continued)

*Primary Examiner* — Hoa C Nguyen
*Assistant Examiner* — Amol Patel
(74) *Attorney, Agent, or Firm* — Knobbe, Martens, Olson & Bear LLP

(57) ABSTRACT

The present invention relates to a cable collector (1; 101; 201; 301) for collecting and managing a cable (8), for connecting an audio device (20) to user equipment, by means of a connection plug (9) fixed to one end of the cable. The cable collector comprises: a) a main body (2; 102; 202; 302) having a first end portion (3; 103; 203; 303) to which the connection plug (9) is intended to be attached, protruding from a surface (3A) thereof; b) a second end portion (4; 104; 204; 304) having a through passage (7; 107; 207; 307) with inner dimensions smaller than a largest outer diameter (D1) of the connection plug, enabling secure retaining of the latter therein in an active cable collecting state; c) a foldable middle portion (5; 105; 205; 305) joining the two end portions; and d) a cable passage (6) formed within the first and second end portions as well as the middle portion of the main body, said passage being adapted to at least partially accommodate a portion of a cable nearest to the connection plug. The present invention also relates to a cable and cable collector unit.

9 Claims, 4 Drawing Sheets

(51) Int. Cl.
*H02G 11/00* (2006.01)
*H04M 1/15* (2006.01)
*H04R 1/10* (2006.01)
*H04M 1/60* (2006.01)
*H04M 1/02* (2006.01)

(52) U.S. Cl.
CPC .......... *H04R 1/1033* (2013.01); *H04M 1/0274* (2013.01); *H04M 1/6058* (2013.01); *Y10T 24/3953* (2015.01)

(56) References Cited

U.S. PATENT DOCUMENTS

| 2002/0012440 A1 | 1/2002 | Hashimoto et al. |
| 2004/0008839 A1 | 1/2004 | Jozitis et al. |
| 2007/0086617 A1 | 4/2007 | Loh |
| 2009/0314515 A1* | 12/2009 | Bevirt et al. ............. 174/110 R |
| 2011/0110552 A1* | 5/2011 | Pang et al. ..................... 381/374 |
| 2011/0252605 A1 | 10/2011 | Rothbaum et al. |
| 2011/0252609 A1 | 10/2011 | Rothbaum et al. |
| 2011/0308049 A1* | 12/2011 | Sun ................................ 24/306 |
| 2012/0121120 A1* | 5/2012 | Gorzelany ................... 381/384 |

FOREIGN PATENT DOCUMENTS

| WO | WO 2010/132501 A2 | 11/2010 |
| WO | WO 2011/068175 A1 | 6/2011 |

OTHER PUBLICATIONS

Office Action in CN 201280052686.8 dated Apr. 3, 2015.
Supplementary European Search Report for EP 12 84 3419 dated Apr. 23, 2015.

* cited by examiner

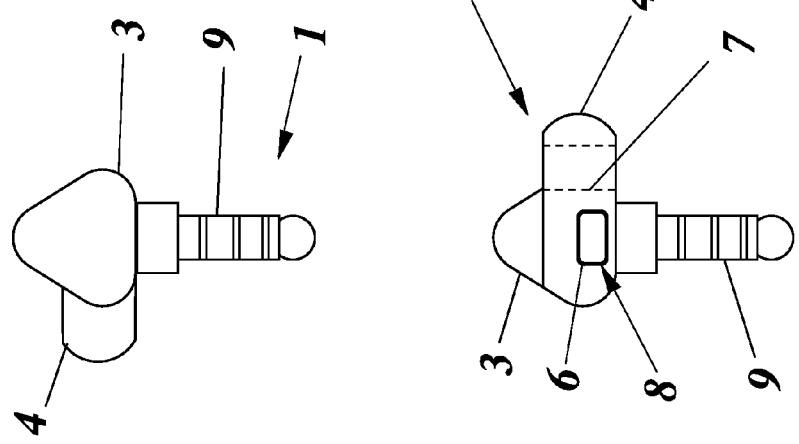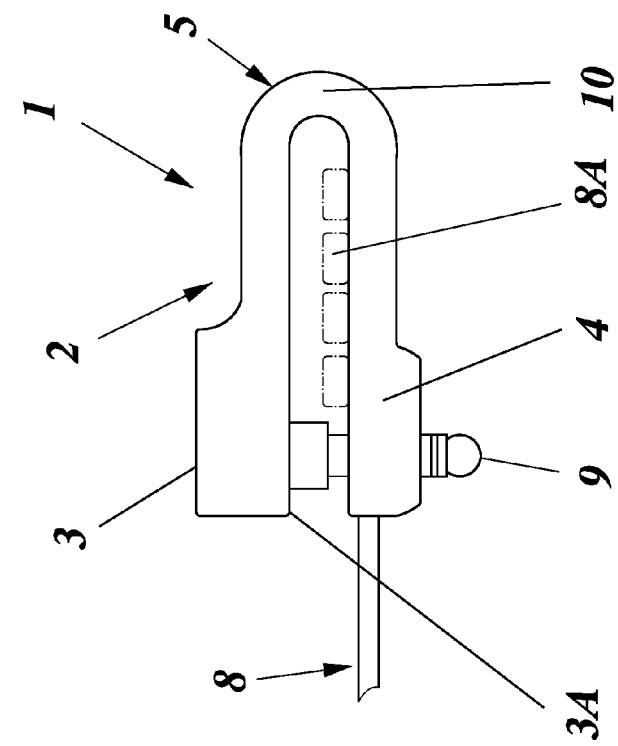

CABLE COLLECTOR

CROSS REFERENCE TO RELATED APPLICATIONS

This application is a U.S. National Phase Application of PCT International Application Number PCT/SE2012/051156, filed on Oct. 26, 2012, designating the United States of America and published in the English language, which is an International Application of and claims the benefit of priority to Swedish Patent Application No. 1151003-9, filed on Oct. 27, 2011. The disclosures of the above-referenced applications are hereby expressly incorporated by reference in their entireties.

TECHNICAL FIELD

The present invention relates to a cable collector. The present invention also relates to a cable and cable collector unit.

BACKGROUND

It is quite common for audio devices, such as headphones, to use a cable for wired connection to user equipment, such as mobile phone, mp3 player, computer or radio. An annoying problem occurring in association with such audio devices having a cable for transmitting and/or receiving audio signals is that the cable often becomes twisted and tangled. This does especially occur when the audio device cable is disconnected from the user equipment and is stowed away in a bag or even a pocket. Apart from being annoying such tangling of the audio cables may eventually lead to the lead wires of the cable becoming disconnected or rupturing.

Presently available cable organizing devices serving to gather cable loops include separate textile bands using hook and loop fasteners or plastic bands having latches at one end portion and a complimentary aperture at the other end. The bands are stretched/wound around wire loops and one end thereof is then fixed to an outer surface of the band with the hook and loop fastener or is brought into latching engagement with the aperture. It is also known to use separate specially designed collector devices to simply wind the cable loosely around a body of the device. In all of these cases the collector devices are separate parts that often become lost or misplaced.

SUMMARY

A general object of the present invention is to provide an improved cable collector, as well as a cable and cable collector unit, solving the above discussed problems.

A specific object is to suggest an improved cable collector, as well as a cable and cable collector unit, including a facility for enabling practical cable collection.

These and other objects are met by the invention as defined by the accompanying claims. The invention generally relates to a cable collector, as well as a unit formed by a cable with a cable collector. The cable is intended for connecting an audio device to user equipment. The cable collector has spaced interconnectable locking members and a support portion for accommodating loops of the cable. In a basic configuration the cable collector includes a male locking member that is a connection plug fixed to one end of the cable for connecting to user equipment and a female locking member that is a passage extending through the cable collector and having inner dimensions being at least partly complementary to outer dimensions of the connection plug.

The basic inventive configurations present the advantages of:
convenient and easily handled cable collection;
no risk of losing the cable collector, since
locking members are integrated in cable; and
cable collection feature always immediately available.

In particular, the present invention relates to a cable collector for collecting and managing a cable, for connecting an audio device to user equipment, such as an audio source or a mobile phone, by means of a connection plug fixed to one end of the cable. The cable collector comprises:
a) a main body having a first end portion to which the connection plug is intended to be attached, protruding from a surface thereof;
b) a second end portion having a through passage with inner dimensions smaller than a largest outer diameter of the connection plug, enabling secure retaining of the latter in the passage in an active cable collecting state;
c) a foldable middle portion joining the two end portions; and
d) a cable passage formed within the first and second end portions as well as the middle portion of the main body, said passage being adapted to at least partially accommodate a portion of a cable nearest to the connection plug.

According to an embodiment the passage is extending through the cable collector and having a full or partly outwardly opening through passage and having inner dimensions being at least partly complementary to outer dimensions of the connection plug. Further, the middle portion may have a support portion for accommodating loops of the cable.

According to a further embodiment, at least the middle portion of the main body consists of a pliable material allowing folding of the body end portions towards each other.

According to another embodiment, the main body may comprise a joint in the middle portion thereof, allowing folding of the body end portions towards each other, said joint being formed by a weakening therein or a separate hinge-like pivot provided therein.

Further, the present invention relates to a cable and cable collector unit comprising a cable for connecting an audio device to user equipment, such as an audio source or a mobile phone, whereby the cable is provided with a cable connection plug fixed to one end of the cable for connecting to user equipment; and a cable collector according to the present invention, and mentioned above, with spaced, interconnectable locking members. Further, the connection plug is attached to the first end portion of the cable collector forming a male locking member for connection with a female locking member formed by the passage extending through the second end portion the cable collector.

In an embodiment of the cable and cable collector unit, the cable can be extended within at least a major portion of the cable collector. Further, the connection plug can be secured stationary to the cable collector and at least a part of the cable collector can be displaceable in relation to the cable. Alternatively, the cable and its connection plug can be irremovably or alternatively removably attached to the cable collector, with the cable irremovably or alternatively removably received within a cable passage extending through the cable collector. Further, the cable collector can be molded over a portion of the cable.

Preferred further developments of the basic inventive idea as well as embodiments thereof are specified in the dependent subclaims.

Advantages offered by the present invention, in addition to those described, will be readily appreciated upon reading the below detailed description of embodiments of the invention.

BRIEF DESCRIPTION OF THE DRAWINGS

The invention and its further objects and advantages will be best understood by reference to the following description taken together with the accompanying drawings, in which:

FIGS. 4-5 are end views from opposite ends of the embodiment of FIGS. 1-3;

FIG. 6 is a schematical side view illustrating an active cable collection state of the embodiment of FIGS. 1-5;

DETAILED DESCRIPTION

Figure 7:
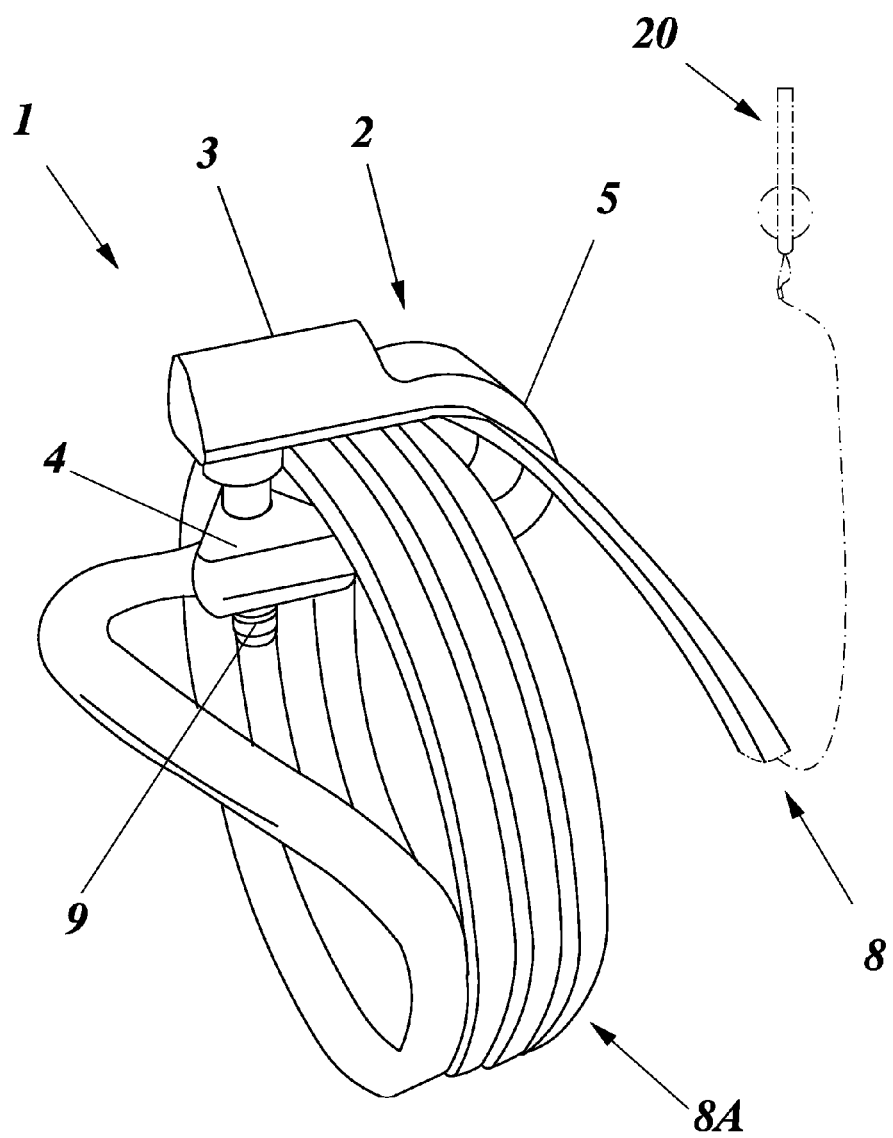
FIG. 7 is a partial perspective view of the first embodiment of the cable and cable collector of the invention in the active collection state of FIG. 6.

The invention will be explained below with reference to exemplifying embodiments of a cable and cable collector unit for an audio device as well a cable collector therefore. These embodiments of the invention relate to an application of the inventive solution to audio devices such as headphones that are connectable to user equipment by means of the cable. As used in the description the term user equipment refers to any type of audio signal transmitting and/or receiving device, such as mobile phone, mp3 player, computer or radio. The standard type headphones that are schematically illustrated in the attached FIG. 7 are given as an example of an audio device but the invention is equally well suited for application to other types of headphones as well as to other types of audio devices as well as other wired devices. It is emphasized that the illustrations are for the sole purpose of describing preferred embodiments of the invention and are not intended to limit the invention to details or to any specific field of application. It shall be realized that the invention covers the incorporation of features related to any of the mentioned applications and any combination of features disclosed herein.

Referring to the previously discussed and commonly encountered problems with twisting and tangling cables used with present day audio devices, such as headphones, it is clear that such problems in general are the cause of inconvenience and frustration when trying to entangle the cables. The invention intends to solve this type of problems by proposing a new concept for a cable collector as well as a cable and cable collector unit. A basic feature of the solution is providing a cable collector that is bound to the cable, thus forming a cable and cable collector unit, by using the actual cable end connection plug as one of two complementary locking members. Such a configuration permits a user to have the cable collector at hand at all times when needed and also eliminates the risk of losing or misplacing the cable collector.

In FIGS. 1-7 is illustrated a first exemplary embodiment of a cable 8 of the type being used for connecting an audio device, such as the exemplary headphone 20 schematically illustrated in FIG. 7, to user equipment, such as an audio source or a mobile phone (not illustrated). The actual cable 8 carries a cable collector 1 that basically includes spaced, interconnectable first and second locking members 9, 7 and a support portion there between for accommodating gathered cable loops or coils 8A. A first male locking member of the cable collector 1 is a connection plug 9 that in the conventional manner is fixed to one end of the cable for connecting to user equipment. The connection plug 9 is partially embedded in a first end portion 3 of a cable collector 1 main body 3, protruding from a surface 3A thereof. The cable collector 1, and specifically its main body 2 has a generally elongate shape with the first end portion 3 to which the connection plug 9 is secured, a second end portion 4 and a foldable middle portion 5 joining the two end portions 3, 4.

Figure 3:
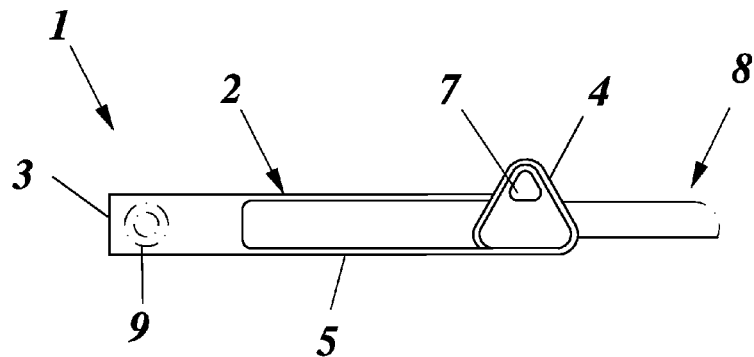
FIG. 3 is a top view of the embodiment of FIGS. 1 and 2.
Figure 2:
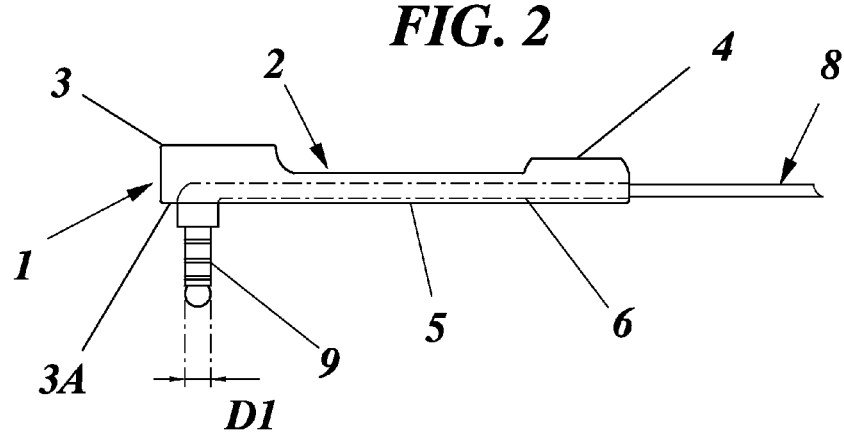
FIG. 2 is a side view of the embodiment of FIG. 1 in an inactive state.
Figure 1:
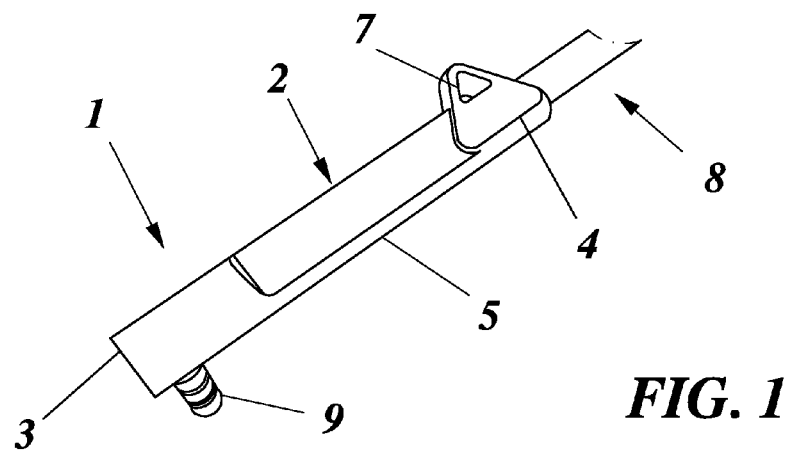
FIG. 1 is a perspective view of a first embodiment of a partially shown cable of the invention having a cable collector attached thereto.

The connection plug 9 male locking member is intended to cooperate with a through passage 7 acting as a female locking member and extending through the cable collector 1 at the main body 2 second end portion 4. The passage 7 is here formed as a full uninterrupted passage that transversely completely penetrates the second end portion 4. It has inner dimensions being complementary to outer dimensions of the connection plug 9, to enable secure retaining of the latter therein. In particular, inner dimensions of the passage 7 are smaller than a largest outer diameter D1 of the connection plug 9. As shown in FIGS. 1-3 the passage has a generally triangular shape providing a secure but easily engageable and releasable fit for the connection plug 9 therein.

The cable 8 end portion carrying the connection plug 9 is extended within at least a major portion of the cable collector 1 main body 2 and exits the main body 2 at the second end portion 4 thereof, at a distance laterally of the passage 7. Specifically, the cable 8 with its connection plug 9 is here irremovably received within a cable passage 6 extending through the cable collector 1. The passage 6 is formed within the first 3 and second 4 end portions as well as the middle portion 5 of the main body 2, and is adapted to at least partially accommodate a portion of a cable 8 nearest to the connection plug 9. The connection plug 9 is thereby secured stationary to the cable collector 1 main body 2 whereas at least a part of the cable collector 1 is displaceable in relation to the cable 8. Such displacement will reduce undesired load on the cable 8 during a later described bending of the main body 2 for interconnecting the first and second locking members 7, 9. In a preferred method of producing the cable 8 with cable collector 1, the cable collector main body 2 is cast over and around part of the end connection plug 9 and an adjoining cable 8 portion, such as by an overmold technique.

The cable collector 1 of this first embodiment has a main body 3 of which at least the middle portion 5 consists of a pliable material. It will be understood that this allows folding of the body end portions 3, 4 towards each other for connecting the two separate locking members 7, 9 after gathered loops 8A of the cable 8 have been introduced between the body end portions, as is illustrated in FIGS. 6 and 7. It will thus be realized that the main object of the invention has been achieved by developing a type of cable collector that is at all times available for easily and conveniently managing cable loops 8A. It provides secure support for the cable loops during stowing thereof.

Figure 10:
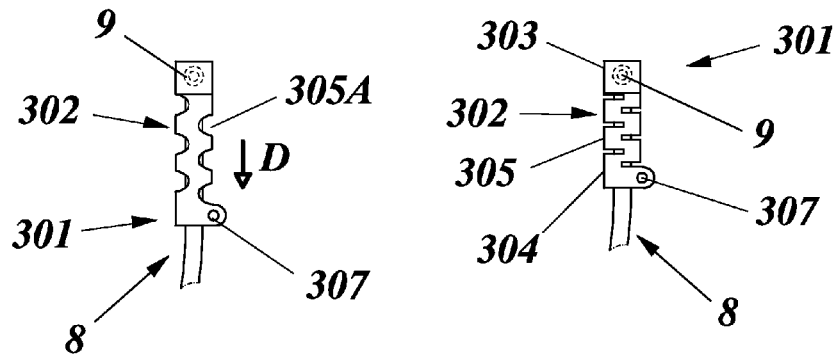
FIG. 10 is a schematical illustration of a fourth embodiment of the cable and cable collector of the invention in relaxed and extended states.
Figure 9:
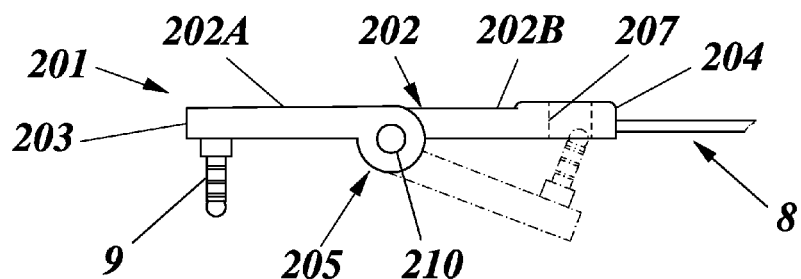
FIG. 9 is a schematical illustration of a third embodiment of the cable and cable collector of the invention illustrated in partly and fully active cable collection states.
Figure 8:
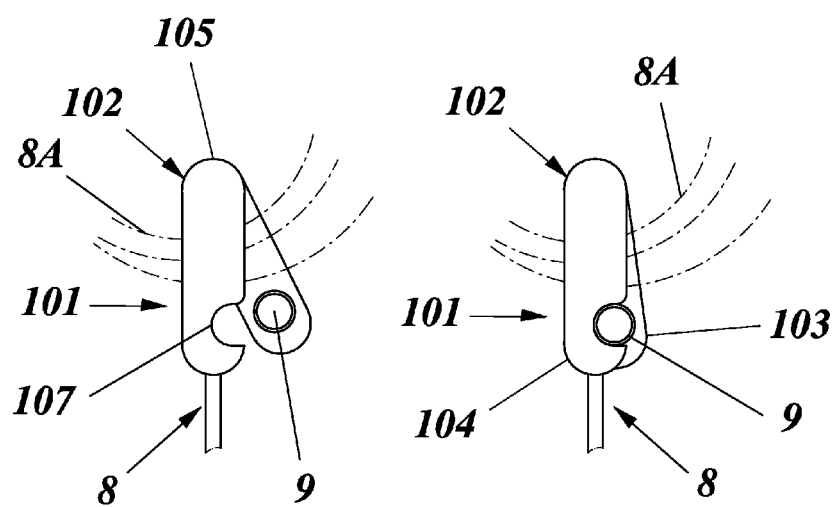
FIG. 8 is a schematical illustration of a second embodiment of the cable and cable collector of the invention in inactive and active cable collection states.

In FIGS. 8-10 are illustrated various other embodiments of a cable 8 with integrated cable collectors 101-301, respectively, where the cable collector end portions 103-303, 104-304 are foldable towards each other by means of alternatively configured pivotal middle portions 105-305.

The embodiment of FIG. 8 relates to an embodiment where the cable collector main body 102 likewise has end portion 103 and 104 integrally joined at a middle portion 105 of pliable material. However, in this embodiment the second locking member 107 is a recess being partly open towards one side of the main body 102 second end portion 104. The partially open recess 107 has inner dimensions being partly complementary to outer dimensions of the connection plug 9. Thus it is open sideways to allow insertion and locking engagement of the cable 8 connection plug 9 from the side when cable loops 8A have been introduced. Two successive phases of this interlocking manipulation of the cable collector are shown in the left and then the right part of the drawing figure.

In the embodiment of FIG. 9 the cable collector 201 main body 202 consists of two separate body sections 202A, 202B containing the respective main body end portions 203, 204, like before. The main body 202 further comprises a joint 210 in the form of a hinge-like pivot in the middle portion 205 thereof, joining the two body sections 202A, 202B. The pivot 210 allows folding of the body end portions 203, 204 towards each other for introducing the cable 8 connection plug 9 into the passage 207 from the top. Such an embodiment requires that the relevant portion of the cable 8 has enough space to move freely and securely in the joint in the middle portion 205 during folding.

Finally, in the embodiment of FIG. 10 is illustrated an embodiment of the cable 8 and cable collector 301 that is basically the same as that of the first embodiment of FIGS. 1-7, except that the main body 302 of the cable collector 301 is formed so as to be elastically extendable. This has been done by forming slits 305A in the middle portion 305 of the cable collector 301, said slits extending partially through the middle portion 305 from both sides thereof. Tensioning of the main body portion 302 enables improved clamping of cable loops in the cable collector after the locking members 9, 307 have been interlocked.

In further alternative, but not specifically illustrated embodiments of the invention variations of the different illustrated parts of the inventive cable with cable collector may be employed without departing from the scope of the invention. The cable extending through the cable collector may alternatively be removably received within a partially open cable passage into which the cable end may be snapped. In another alternative configuration said joint between the main body end portions may be formed by a folding line or weakening therein. However, for all embodiments of the inventive cable collector main body the cable should be free to move within the body, at least in the area of the folding joint and adjoining areas.

The invention has been described in connection with what is presently considered the most practical and preferred embodiments but it shall be understood that the invention is not limited to the disclosed embodiments. It likewise covers any feasible combination of features described and illustrated herein and is therefore intended to cover various modifications and equivalent arrangements included within the spirit and scope of the appended claims.

The invention claimed is:

1. A cable collector for collecting and managing a cable, for connecting an audio device to user equipment by a connection plug fixed to one end of the cable, comprising:
    a main body having a first end portion to which the connection plug is intended to be attached, protruding from a surface thereof;
    a second end portion having a through passage with inner dimensions smaller than a largest outer diameter of the connection plug, enabling secure retaining of the connection plug in the passage in an active cable collecting state;
    a foldable middle portion joining the two end portions; and
    a cable passage formed within the first and second end portions as well as the accommodate a portion of the cable nearest to the connection plug,
    wherein the through passage extending through the cable collector comprises a full or partly outwardly opening through passage comprising inner dimensions being at least partly complementary to outer dimensions of the connection plug.

2. The cable collector according to claim 1, wherein the middle portion is a support portion for accommodating loops of the cable.

3. The cable collector according to claim 1, wherein the middle portion of the main body comprises a pliable material allowing folding of the body end portions towards each other.

4. The cable collector according to claim 1, wherein the main body comprises a joint in the middle portion thereof, allowing folding of the body end portions towards each other, said joint being formed by a weakening therein or separate hinge-like pivot provided therein.

5. A cable and cable collector unit comprising:
    a cable for connecting an audio device to user equipment, whereby the cable is provided with a cable connection plug fixed to one end of the cable for connecting to user equipment; and
    a cable collector according to claim 1 with spaced, interconnectable locking members, wherein the connection plug is attached to the first end portion of the cable collector forming a male locking member for connection with a female locking member formed by the passage extending through the second end portion of the cable collector.

6. The cable and cable collector unit according to claim 5, wherein the cable is extended within at least a major portion of the cable collector.

7. The cable and cable collector unit according to claim 5, wherein the connection plug is secured stationary to the cable collector and that at least a part of the cable collector is displaceable in relation to the cable.

8. The cable and cable collector unit according to claim 5, wherein the cable and the connection plug are irremovably or alternatively removably attached to the cable collector, with the cable irremovably or alternatively removably received within a cable passage extending through the cable collector.

9. The cable and cable collector unit according to claim 6, wherein the cable collector is molded over a portion of the cable.

* * * * *

UNITED STATES PATENT AND TRADEMARK OFFICE
CERTIFICATE OF CORRECTION

| | | |
|---|---|---|
| PATENT NO. | : 9,231,398 B2 | Page 1 of 1 |
| APPLICATION NO. | : 14/240574 | |
| DATED | : January 5, 2016 | |
| INVENTOR(S) | : Erik Petersén | |

It is certified that error appears in the above-identified patent and that said Letters Patent is hereby corrected as shown below:

Claims

In column 6 at line 15 (approx.), In Claim 1, after "as the" insert --middle portion of the main body, said passage being adapted to at least partially--.

Signed and Sealed this
Twenty-sixth Day of April, 2016

Michelle K. Lee
*Director of the United States Patent and Trademark Office*